United States Patent [19]

Kleiman

[11] Patent Number: 4,643,532
[45] Date of Patent: Feb. 17, 1987

[54] FIELD-ASSISTED BONDING METHOD AND ARTICLES PRODUCED THEREBY

[75] Inventor: Rafael N. Kleiman, Summit, N.J.

[73] Assignee: AT&T Bell Laboratories, Murray Hill, N.J.

[21] Appl. No.: 748,032

[22] Filed: Jun. 24, 1985

[51] Int. Cl.[4] ............................ C09K 3/34; C23C 27/00
[52] U.S. Cl. .......................................... 350/343; 65/36; 65/43; 65/59.21; 65/59.22; 350/344
[58] Field of Search ............... 65/43, 36, 59.21, 59.22; 350/343, 344

[56] References Cited

U.S. PATENT DOCUMENTS

| | | | |
|---|---|---|---|
| 3,397,278 | 8/1968 | Pomerantz | 174/52 |
| 4,097,309 | 6/1978 | Horne | 136/89 PC |
| 4,239,345 | 12/1980 | Berreman et al. | 350/331 R |
| 4,269,617 | 5/1981 | Shibuya et al. | 65/43 |
| 4,362,771 | 12/1982 | Umeda et al. | 156/306.6 |
| 4,367,924 | 1/1983 | Clark et al. | 350/334 |
| 4,452,624 | 6/1984 | Wohltjen | 65/43 X |

OTHER PUBLICATIONS

*Journal of Applied Physics,* vol. 40(10) Sep. 1969, "Field Assisted Glass–Metal Sealing" by George Wallis et al, pp. 3946–3949.
*Proceedings of the IEEE,* vol. 70, No. 5, May 1982, "Silicon as a Mechanical Material" by K. E. Petersen, pp. 420–457.
*Glass–To–Metal Seals* by J. H. Partridge, 1949—Foreword.

Primary Examiner—Arthur Kellogg
Attorney, Agent, or Firm—Eugen E. Pacher

[57] ABSTRACT

Disclosed is an electric field-assisted method for bonding one glass (or other inorganic insulator) body, typically a plate, to a similar body, such that the two bodies are spaced apart. The interior volume of such a composite body is advantageously filled with liquid crystal material, to produce a liquid crystal display cell. The method comprises forming a patterned layer of an appropriate bonding material (e.g., Al, Ge, Si, preferably Si) on a major surface of one of the two insulator bodies, placing a major surface of the second insulator body into contact with the bonding material, heating at least the second body to a bonding temperature (typically in the range 250°–600° C.), and applying a voltage (e.g., 500–1500 volt DC, the second body negative) across the thus formed sandwich. This procedure results in formation of a strong bond between the bonding material and the second body, does not require electrical contact to the bonding material, permits the bonding of bodies whose coefficients of thermal expansion differ substantially from that of the bonding material, and can produce liquid crystal cells of closely controlled, uniform cell thickness.

15 Claims, 1 Drawing Figure

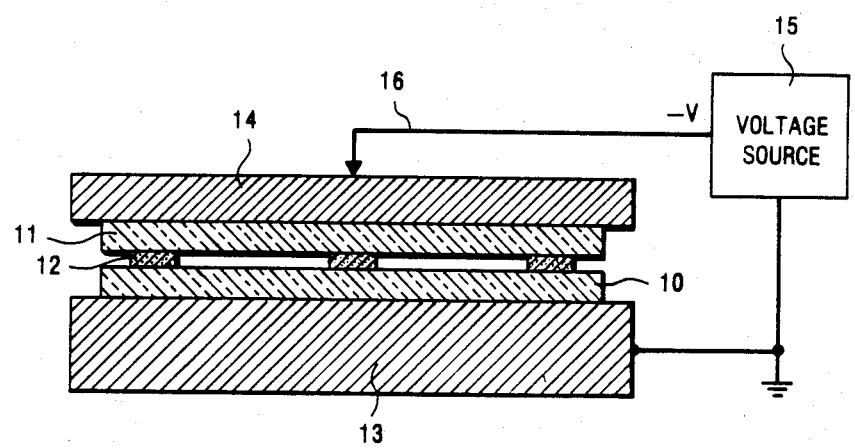

FIELD-ASSISTED BONDING METHOD AND ARTICLES PRODUCED THEREBY

FIELD OF THE INVENTION

This invention pertains to methods for bonding of one inorganic insulator body to another, with a space of predetermined thickness between the bonding surfaces, and to articles produced by the method. An exemplary article is a liquid crystal cell.

BACKGROUND OF THE INVENTION

The necessity to bond one inorganic insulator, typically a glass body, to another inorganic insulator body, such that the bodies are spaced apart, with a predetermined spacing therebetween, arises frequently in science and technology. For instance, it arises in the manufacture of liquid crystal (LC) display cells.

The prior art has solved the problem by use of adhesive, e.g., epoxy, with spacer bodies suspended therein, together with, typically, placement of spacers in adhesive-free regions between the bonding surfaces. The spacers typically are glass fibers, powder particles, styrene spheres, or other small bodies of relatively closely controlled dimensions. See, for instance, U.S. Pat. No. 4,362,771. With such techniques, uniformity and/or accuracy of cell thickness is frequently difficult to achieve.

It has been known for some time that a strong bond can be formed between a metal (including a semiconductor) and a glass (or other appropriate inorganic insulator) by application of an appropriate voltage across the glass/metal interface, while maintaining the parts at elevated temperature, e.g., 300°–600° C. See G. Wallis and D. I. Pomerantz, *Journal of Applied Physics*, Vol. 40(10), pp. 3946–3949 (1969), and U.S. Pat. No. 3,397,278, both incorporated herein by reference. Such field-assisted bonding has, inter alia, been employed to adhere the semiconductor substrate of a solar cell to glass pads on a support structure. See U.S. Pat. No. 4,097,309.

Some LC display cells require, in order to function properly, maintenance of plate spacing uniformity to within very narrow limits. For instance, in bistable cells of the type disclosed in U.S. Pat. No. 4,239,345, a typical plate spacing is about 10 $\mu$m, ±1%. Such accuracy is difficult to achieve with prior art methods. In cells of the type disclosed by clark et al (U.S. Pat. No. 4,367,924) typical spacing is about 1 $\mu$m. Again, cells with such small spacings are difficult to fabricate by prior art methods.

Since bistable LC cells and other articles that require bonding two inorganic insulator bodies, with closely controlled spacing between the bonded surfaces, are of considerable technological and scientific importance, a simple method for accomplishing such bonding, over a wide range of spacings, would be of great interest. This application discloses such a method.

SUMMARY OF THE INVENTION

I have discovered a convenient method for forming an article comprising a composite body (a "cell"), the cell comprising a first inorganic insulator body bonded to a second inorganic insulator body, each body having at least one substantially planar major surface, the major surfaces (the "bonding" surfaces) facing each other and spaced apart a predetermined distance.

The method comprises forming a layer of "bonding material" on the major surface of the first body such that part of the major surface is free of bonding material, placing the major surface of the second body into contact with the layer of bonding material, heating at least the second body to a "bonding temperature", and applying a voltage across the thus formed sandwich for a time sufficient to result in bonding of the second body to the bonding material.

The bonding material is chosen from the group of materials consisting of the metals and semiconductors having a melting temperature greater than about 250° C. Preferred bonding materials are Al, Ge, and Si, with Si being most preferred. The thickness of the layer of bonding material is substantially equal to the thickness of the cell to be formed. The polarity of the voltage is such as to make, for at least part of the time of application, the bonding material positive with respect to the second body. The voltage typically is between about 500 and about 1500 V. Maintaining the temperature and applied voltage for a sufficient length of time results in establishment of a strong bond between the layer material and the bonding surface of the second body, with the distance between the two bonding surfaces substantially equal to the thickness of the layer of bonding material.

The sandwich is heated to, and maintained at, the bonding temperature, i.e., a temperature at which the resistivity of the second insulator body is significantly reduced, without softening or melting of the body, or melting of the bonding material. A representative temperature range, useful, for instance, when using soda-lime glasses, is about 250°–600° C. The temperature and voltage are maintained for a time sufficient to result in formation of the desired bond, typically from a few seconds to an hour, depending, into alia, on the material combination, temperature, and applied voltage.

In preferred embodiments, at least one of the two bodies is a glass plate, the layer of bonding material is a patterned Al, Ge, or Si layer (most preferably a patterned Si layer), of substantially uniform thickness, produced by standard deposition, photolithography and etching techniques, and the article thus formed is a LC display cell, i.e., a cell substantially filled with LC material.

The inventive technique makes possible easy manufacture of cells having cell thickness between about 0.5 $\mu$m and about 20 $\mu$m. The thickness can frequently be maintained costant to within about ±1%, or to within about ±0.1 $\mu$m, whichever is greater.

BRIEF DESCRIPTION OF THE DRAWING

FIG. 1 schematically depicts an exemplary version of the field-assisted bonding method.

DETAILED DESCRIPTION

A significant aspect of the invention is the discovery that field-assisted bonding can be used to bond one inorganic insulator body to another such body. A further aspect of the invention is the discovery that the inventive bonding technique can economically and conveniently produce articles, e.g., LC cells, with accurately defined spacing between the two bodies, over a rather wide range of spacings. The invention thus solves a problem that exists, for instance, in the field of LC displays, where it is found necessary, for at least some types of devices, to fabricate cells to quite exacting tolerances, tolerances that may at best be difficult to achieve by prior art methods.

The invention can be used to bond substantially any inorganic insulator body of appropriate shape to an appropriate bonding material (e.g., Al, Si, or Ge) deposited onto any inorganic insulator body of appropriate shape. Typically at least one of the two bodies is platelike, the layer of bonding material is typically a patterned layer, and the two bonding surfaces are substantially plane, such that an article having a relatively wide and long, but relatively thin, interior space is created. Such an article is referred to herein as a "cell". Cells are useful, for instance, in LC liquid crystal display devices, and the production of LC devices is a preferred application of the inventive method. The invention will now be further illustrated, especially with reference to some preferred embodiments.

We have found that the inventive method makes it possible to bond insulator materials having a relatively wide range of thermal expansion coefficient to the bonding layer, and thereby to form a cell. This, for instance, makes possible the use of soda-lime glass, in conjunction with a Si bonding layer. Soda-lime glass can advantageously be used in LC cells, since it is not subject to substantial leaching. Such leaching is a problem with, for instance, borosilicate glasses, which have a coefficient of expansion relatively close to that of Si. We believe that the above-described advantage of the inventive method is a consequence of the method's use of very thin bonding layers.

FIG. 1 schematically depicts, in cross section, an arrangement for the practice of the invention. On insulator body 10, for instance, a glass plate such as a standard microscope slide, is formed a patterned bonding layer 12, preferably a patterned Si layer. The patterned layer can be formed by any appropriate means, including patterned deposition through a mask material. An advantageous procedure takes advantage of techniques developed in the field of semiconductor manufacturing, namely vapor deposition for layer formation, photolithography for forming and patterning a processing layer (the resist) atop the deposited bonding layer, and etching (wet or dry) of the bonding layer, whereby the bonding material regions that are exposed to the etching medium are removed, whereas regions that are covered by resist remain. Such techniques are well known to those skilled in the art.

After removal of the resist, an inorganic insulator body 11 is placed onto the patterned bonding layer, such that a major surface of 11 is at least macroscopically in contact with 12. The thus formed sandwich is heated by appropriate means, for instance, by being placed onto a hot plate 13, and an electrical potential applied across the sandwich, e.g., by means of voltage source 15, whose negative terminal is connected by means of contact 17 to metal electrode 14, with the other terminal being connected to ground and to 13. It is to be emphasized that the invention method does not require electrical contact to the metal bonding layer, in distinction from the prior art. It is this feature of the inventive method which allows convenient bonding to isolated small regions of bonding layer, e.g., "pads" in LC cells.

As is known to those skilled in the art, 15 typically is a DC source, but it can also be a source of a time-varying voltage, such as a square wave or a pulse train. Indeed, 15 can also be a source of AC voltage, or of an AC voltage superimposed on a DC voltage, and in some cases it may be preferable to apply an AC voltage.

The mechanism of field assisted glass-metal bonding has been discussed in the above referred to paper by G. Wallis et al. Briefly, application of the voltage is believed to result in formation of a space charge layer in the insulator at the metal/insulator interface, with a significant fraction of the total voltage drop occurring across the space charge region and the adjacent interface. The voltage drop across the interface is thought to result in an electrostatic force that urges the insulator surface into intimate contact with the bonding material, as well as a drift of ions across the interface, resulting in bond formation. Although the mechanism disclosed by Wallis is currently thought to be substantially correct, the invention is not dependent on the correctness of any proposed mechanism, and therefore is not in any way limited thereby.

The bonding can be carried out in air, in vacuum, in an inert atmosphere, or in any other appropriate atmosphere, e.g., reducing or oxodizing atmosphere. Heating can be by any appropriate method, including in a furnace, on a hot plate, or by means of infrared or other radiation. The voltage can also be applied in any appropriate manner, e.g., by making direct (point) contact with the (cathodic) insulator body if the bonding region is relatively small, or by use of a platelike metal electrode.

In some preferred embodiments both insulator bodies are glass bodies, typically platelike, for instance, sodelime glass, borosilicate glass, high-silica glass, or quartz glass, and the bonding material is Si. Preferred articles produced by means of the invention are LC cells. The method can be used to form cells of a wide range of thickness, e.g., from about 0.5 $\mu$m to about 20 $\mu$m, advantageously by from about 0.5 $\mu$m to about 10 $\mu$m. The lower thickness limit is usually due to the fact that the major surfaces re not ideally flat, and the upper limit due to the fact that stresses due to differential thermal expansion may become unacceptably large. It is apparent then that the limits depend on the details of the method, thinner cells being producible with bodies having a highly flat major surface, and thicker cells if the expansion coefficients of first body, bonding layer, and second body are well matched. In a currently preferred embodiment, both bodies are soda-lime glass.

The inventive method makes it possible to produce cells whose cells thickness can be kept within close tolerances. For instance, for thicknesses of 2 $\mu$m or above, the thickness can frequently be kept constant to within $\pm 1\%$ over an area of 1 cm$^2$ or more, and for thicknesses less than 2 $\mu$m, the variation can be less than $\pm 0.1$ $\mu$m over a similar area. However, it will be appreciated that the method is not limited to the production of cells of nominally constant thickness, and it can be used to produce "wedge" cells, by deposition of a bonding layer of appropriately varying thickness.

EXAMPLE

Two ground, flat soda-lime glass plates (2"×2") were cleaned by a standard procedure, Si evaporated through a mask onto the ground surface of the first of the two plates, at a rate of about 20 Å/sec, forming 10 parallel Si strips (0.75 $\mu$m thick, 0.5 mm wide, 4 mm spacing, 40 mm long). The evaporation was carried out in a vacuum of about $10^{-7}$ Torr. The two glass plates were assembled to form a sandwich, with the Si strips contacting the surface of the second glass plate, the sandwich was heated slowly to 335° C. by means of a hot plate, and 1000 VDC applied for 10 minutes to the sandwich, with the first plate being positive. After disconnecting the sandwich from the voltage source, the assembly was allowed to cool slowly (~50° C./min) to room temperature. Bonding had occurred substantially on all of the Si surface area. The spacing between the glass plates was uniform to better than a quarter wavelength of the sodium line over most of the plate area.

What is claimed is:

1. Method of manufacturing an article comprising a "cell", the cell comprising a first and a second inorganic insulator body, the insulator material having a softening temperature or a melting temperature, each insulator body having at least one substantially plane major surface, the first insulator body bonded to the second insulator body, with the major surfaces opposed and with a predetermined spacing between the opposed major surfaces, the spacing to be referred to as the "cell thickness", characterized in that the method comprises (a) forming a layer of bonding material on the major surface of the first insulator body such that part of the major surface is free of bonding material, the bonding material chosen from the group consisting of those metals and semiconductors that have a melting point greater than about 250° C., the layer thickness being substantially equal to the cell thickness;

(b) forming a combination by placing the major surface of the second insulator body into contact with the layer of bonding material;

(c) heating the combination to a bonding temperature and applying a voltage across the heated combination for a time sufficient to result in bonding of the second insulator body to the bonding material to form the cell of predetermined cell spacing, the bonding temperature being lower than the melting temperature of the bonding material and the softening or melting temperature of the insulator material, the bonding temperature also being high enough to render the heated first and second insulator bodies sufficiently electrically conductive to permit some current to flow in response to the applied voltage, the applied voltage being such that the second insulator body is negative with respect to the bonding material layer for at least part of the time the voltage is applied.

2. Method of claim 1, wherein the bonding material is selected from the group consisting of Al, Ge, and Si.

3. Method of claim 2, wherein the second insulator body is a glass body.

4. Method of claim 2, wherein the layer of bonding material is a layer of substantially uniform thickness.

5. Method of claim 2, wherein the layer of bonding material is formed by a process comprising depositing a layer of bonding material, and exposing one or more predetermined regions of the layer to an etching medium.

6. Method of claim 2, wherein the voltage is a DC voltage less than about 1500 volts.

7. Method of claim 2, wherein at least one of the two insulator bodies is a platelike glass body.

8. Method of claim 7, wherein the glass body consists substantially of soda-lime glass.

9. Method of claim 4, wherein the layer of bonding material is between about 0.5 $\mu$m and about 20 $\mu$m thick.

10. Method of claim 9, wherein the layer of bonding material comprises a multiplicity of separate, unconnected regions.

11. Method of claim 8, wherein the bonding material consists substantially of Si.

12. An article produced by a process comprising the method of claim 1.

13. Article of claim 12, wherein the cell is substantially filled with liquid crystal material.

14. Article of claim 13, wherein the cell has a cell thickness between about 0.5 $\mu$m and about 20 $\mu$m.

15. Article of claim 14, wherein the cell thickness is less than about 2 $\mu$m, and the thickness is constant to within about ±0.1 $\mu$m.

* * * * *